United States Patent [19]

Shiba et al.

[11] 4,180,220

[45] Dec. 25, 1979

[54] TAPE CASSETTE

[75] Inventors: Haruo Shiba; Takateru Sato, both of Tokyo, Japan

[73] Assignee: TDK Electronics Co., Ltd., Tokyo, Japan

[21] Appl. No.: 933,580

[22] Filed: Aug. 14, 1978

[30] Foreign Application Priority Data

Oct. 28, 1977 [JP] Japan .......................... 52-144801[U]

[51] Int. Cl.² .............................................. G03B 1/04
[52] U.S. Cl. .................................... 242/199; 242/199
[58] Field of Search ....................... 242/195, 197–200; 352/72, 78 R; 360/132, 93; 206/389; 220/246, 348, 334

[56] References Cited

U.S. PATENT DOCUMENTS

| 3,987,489 | 10/1976 | Schoettle et al. | 360/132 |
| 4,019,695 | 4/1977 | Wharam | 242/199 |
| 4,021,006 | 5/1977 | Morimoto et al. | 242/199 |
| 4,022,395 | 5/1977 | Kishi | 242/198 |
| 4,083,472 | 4/1978 | Wharam | 220/334 |

Primary Examiner—Leonard D. Christian
Attorney, Agent, or Firm—Oblon, Fisher, Spivak, McClelland & Maier

[57] ABSTRACT

A tape cassette comprises a cover for covering a wound tape which comprises a polar member mounted on a wall of the cover and a coil spring fitted to the polar member. The polar member has a narrow width slit at the free end and a wide width slit adjacent to the narrow width slit at the side of the fixed end and one end of the coil spring is inserted in to the wide width slit through the narrow width slit and the other end of the coil spring is contacted with a case body.

4 Claims, 7 Drawing Figures

U.S. Patent  Dec. 25, 1979  Sheet 1 of 2  4,180,220
FIG. 1  Prior Art
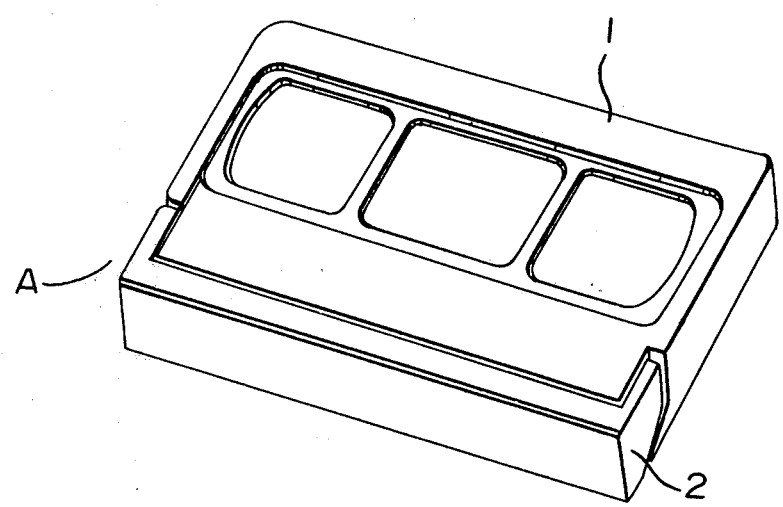
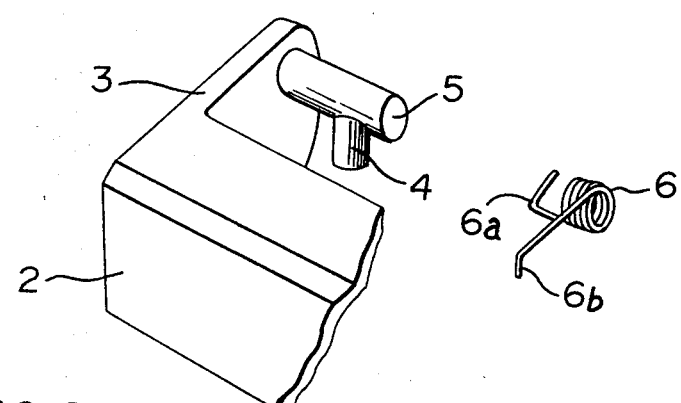
FIG. 2a Prior Art    FIG. 2b Prior Art

TAPE CASSETTE

BACKGROUND OF THE INVENTION

1. Field of the Invention

The present invention relates to a tape cassette having a cover for opening and closing to cover the tape.

2. Description of the Prior Art

The tape cassette shown in FIG. 1 has been mostly used as a tape cassette especially a video tape cassette.

In FIG. 1, a body (1) is connected to a cover for opening and closing (2) to cover a tape (not shown) in the body in the non-using condition.

The cover (2) is opened only when the tape cassette is set in a transducing apparatus. Accordingly, the cover (2) is pushed toward the body (1) so as to close the cover in the non-using condition. Accordingly, a coil spring (6) is fitted on a polar member (5) having a projection (4) which is disposed at the side wall (3) of the cover (2) as shown in FIGS. 2(a) and (b) and one end (6a) of the coil spring (6) is fixed by the project (4) and the other end (6b) is contacted with the body (1). Thus, in such structure, the spring (6) could not be easily fitted on the polar member (5) because of the projection (4) and the processing for the assemble is not easily attained.

SUMMARY OF THE INVENTION

It is an object of the present invention to provide a tape cassette which can be easily assembled especially in the fitting of a coil spring on a polar member.

The foregoing and other objects of the present invention have been attained by providing a tape cassete having a cover for covering a tape wherein a polar member for fixing a coil spring is mounted on the cover and the polar member has a narrow width slit at the free end and a wide width slit adjacent to the narrow width slit at the side of the fixed end and one end of the coil spring is inserted into the wide width slit and the other end of the coil spring is contacted with the case body.

BRIEF DESCRIPTION OF THE DRAWINGS

FIG. 1 is a schematic view of a tape cassette;

FIGS. 2(a) and 2(b) are partially enlarged part assembly views of the part A of FIG. 1 in the conventional tape cassette;

DETAILED DESCRIPTION OF THE PREFERRED EMBODIMENT

Figure 3:
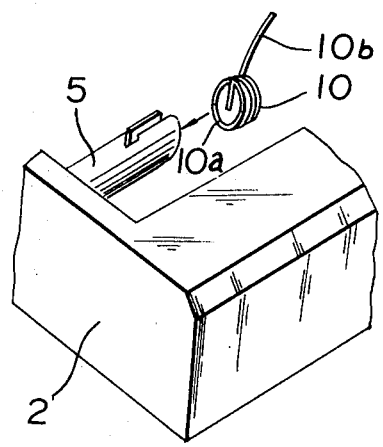
FIG. 3 is a partially enlarged part assembly view of the part A of FIG. 1 in the tape cassette according to the present invention.
Figure 4A:
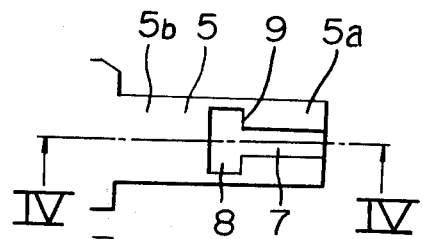
FIG. 4(a) is a plan view of part 5 of FIG. 3.
Figure 4C:
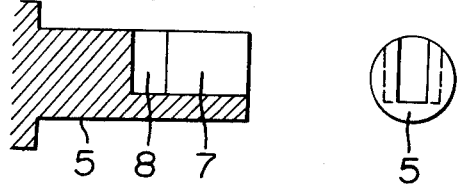
FIG. 4(b) is a side view and FIG. 4(c) is a sectional view taken along the line IV—IV of FIG. 4(a).
Figure 4B:
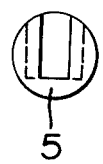

Referring to FIGS. 3 and 4, one embodiment of the present invention will be illustrated.

In the tape cassette especially the video tape cassette, the cover (2) is connected to the body (1) to cover the tape. The cover (2) is closed by a spring (6) fitted on the polar member (5) mounted on the side wall (3) of the cover (2).

In FIG. 3 and 4(a) and 4(c), the polar member (5) is mounted on the side wall of the cover (2). The polar member (5) has no projection but has slits (7), (8). The width of slit (7) near the free end (5a) of the polar member (5) is narrow whereas the width of the slit (8) near the fixed end (5b) is wide and both of the slits are connected.

A coil spring (10) is fitted on the polar member. One end (10a) of the coil spring (10) is inserted in the slit (8) and the other end (10b) is contacted with the body (1). When one end (10a) of the coil spring (10) is inserted in the slit (8), the end (10a) is inserted through the slit (7) formed at the free end (5a) of the polar member (5). In the assembly, the end (10a) of the coil spring is disposed at the slit (8) under the actuation of the spring whereby the end (10a) is not disconnected by the boundary (9) between the narrow slit (7) and the wide slit (8).

In accordance with the present invention, the structure of the spring for opening and closing the cover of the tape cassette is significantly simple and the spring can be easily assembled and nevertheless the assembly of the spring is complete without any failure of the disconnection. Moreover, the cover can be easily molded because of no projection on the polar member mounted on the side wall.

What is claimed as new and desired to be secured by Letters Patent of the United States is:

1. In a tape cassette having a cover for covering a wound tape which comprises a polar member mounted on a wall of the cover and a spring fitted to the polar member, an improvement characterized in that the polar member has a narrow width slit at the free end and a wide width slit adjacent to the narrow width slit at the side of the fixed end and one end of the spring is inserted into the wide width slit and the other end of the spring is contacted with a case body.

2. A tape cassette according to claim 1 wherein the spring is a coil spring and one end of the coil spring is bent to the central direction and the other end is projected out of the coil.

3. A tape cassette according to claim 2 wherein the narrow width slit is opened to the edge of the polar member to guide the end of the coil spring bent to the central direction.

4. A tape cassette according to claim 2 wherein the wide width slit is formed adjacent to the narrow width slit to receive the end of the coil spring bent to the central direction.

* * * * *